T. ROSE.
MACHINE FOR FORMING SHEETS OF PLASTIC MATERIAL.
APPLICATION FILED SEPT. 18, 1918.

1,303,966.

Patented May 20, 1919.
3 SHEETS—SHEET 1.

Inventor
Thomas Rose.

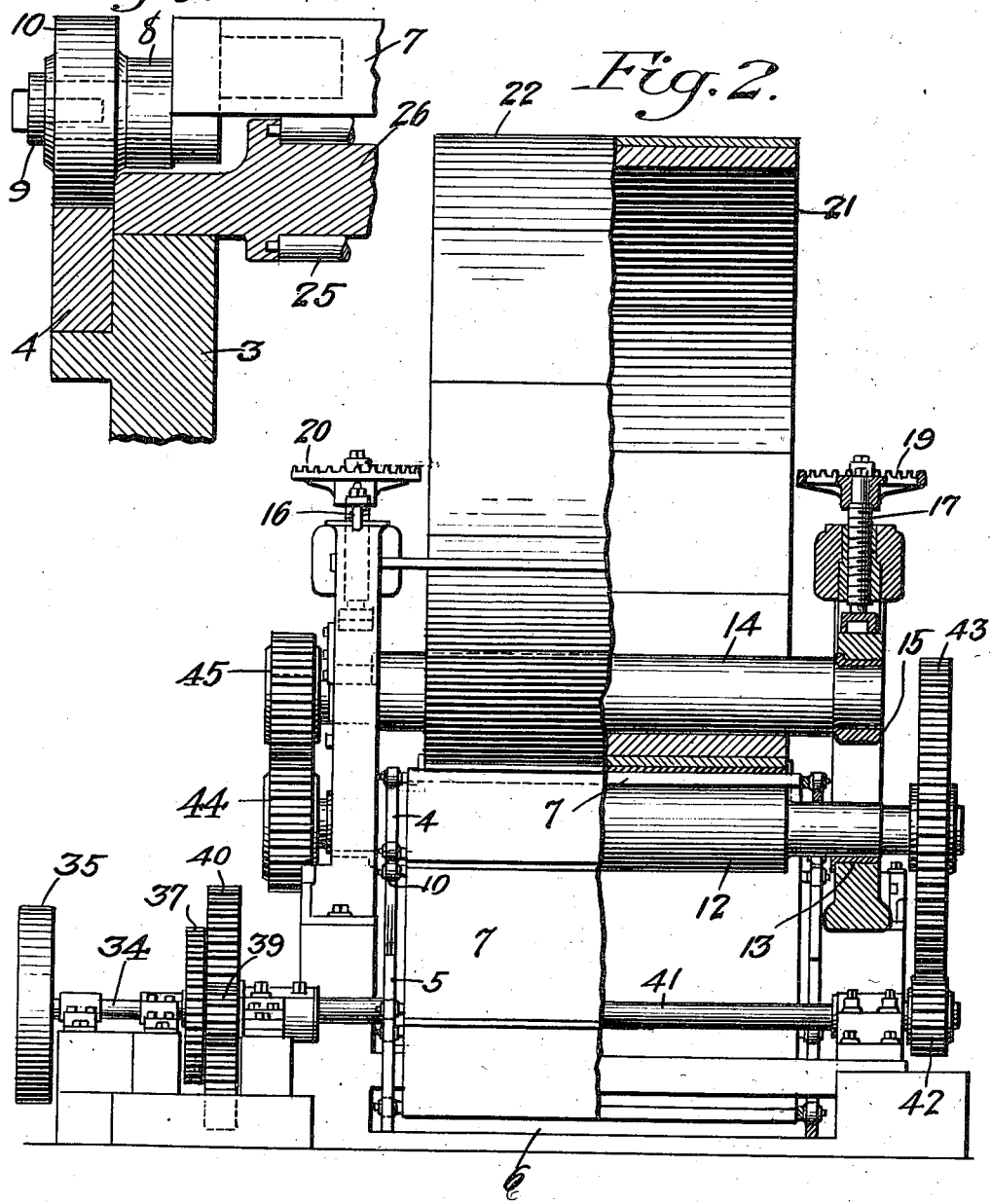

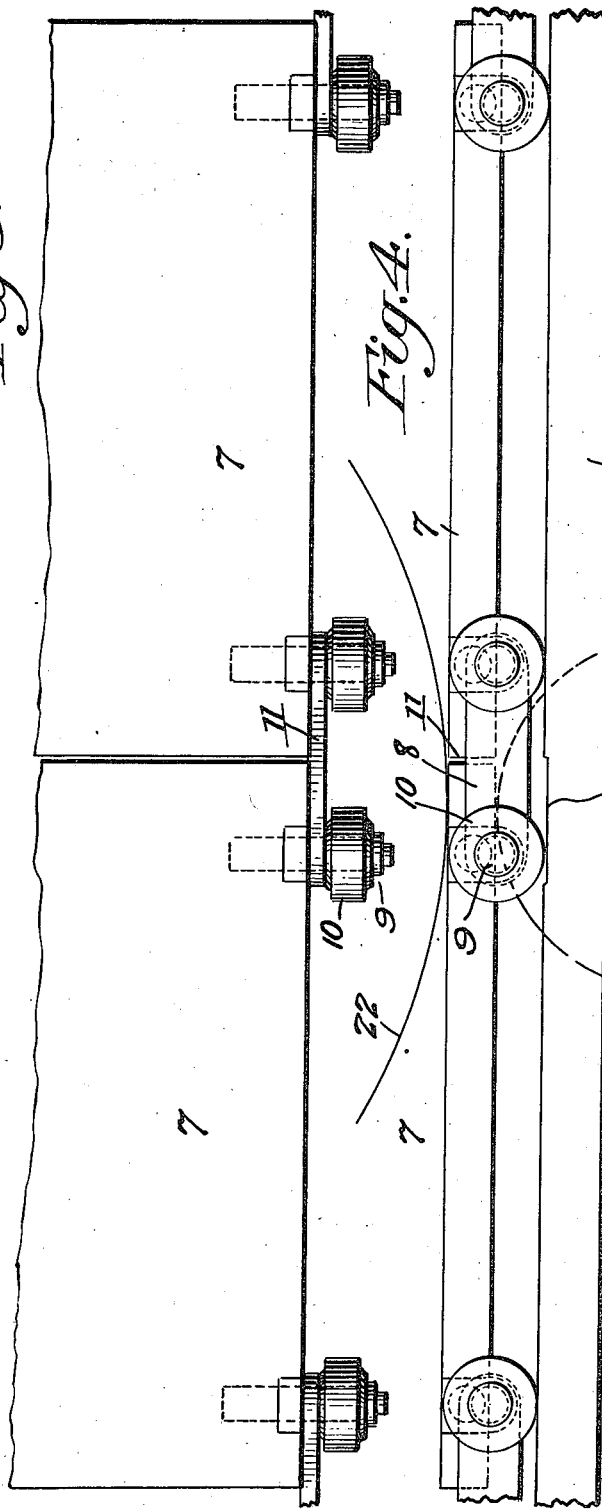
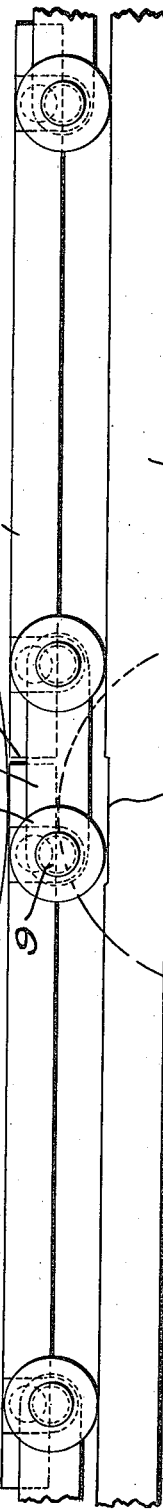
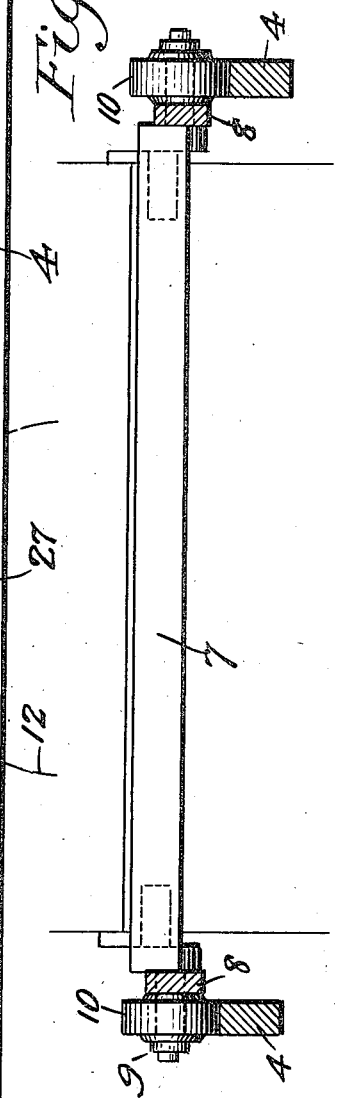

UNITED STATES PATENT OFFICE.

THOMAS ROSE, OF MILWAUKEE, WISCONSIN.

MACHINE FOR FORMING SHEETS OF PLASTIC MATERIAL.

1,303,966.        Specification of Letters Patent.        Patented May 20, 1919.

Application filed September 18, 1918. Serial No. 254,552.

*To all whom it may concern:*

Be it known that I, THOMAS ROSE, a citizen of the United States, residing at Milwaukee, in the county of Milwaukee, State of Wisconsin, have invented certain new and useful Improvements in Machines for Forming Sheets of Plastic Material; and I do hereby declare the following to be a full, clear, and exact description of the invention, such as will enable others skilled in the art to which it appertains to make and use the same.

This invention relates to a machine for forming sheets of plastic material, and it is especially designed for forming sheets of asbestos which are of the form used in the manufacture of asbestos shingles and similar building articles.

The primary object of the invention resides in the provision of a machine by means of which sheets of uniform density and of fine finish may be formed without the loss of material and without the disadvantages attending machines of this character.

I attain this object, broadly, by thoroughly agitating the material as it leaves the hopper, smoothing the material into a layer of uniform thickness and compacting the material while the same is in a dry state. To this compacted material just sufficient water to set the cement which is used in conjunction with the asbestos, is added. The moist and partly compacted material then passes to and between a pair of pressure rolls where the final pressure is produced. One of these pressure rolls operates through a drum which carries one set of molds, and this drum is of such great diameter that the pressure is gradually increased until the material is directly between the pressure rolls.

In the drawing:

Fig. 2 is an end elevation partly broken away to more clearly disclose the mechanism;

Fig. 3 is a fragmental view of a pair of the lower molds, showing the manner in which they are connected together;

Fig. 4 is a side elevation thereof;

Fig. 5 is an end elevation of one of the molds, the supporting wheels being disclosed and the tracks for said wheels being shown in section, and Fig. 6 is a fragmental detail sectional view showing the manner in which the molds are supported by the roller bearings as the pressure is applied to the material.

Figure 1:
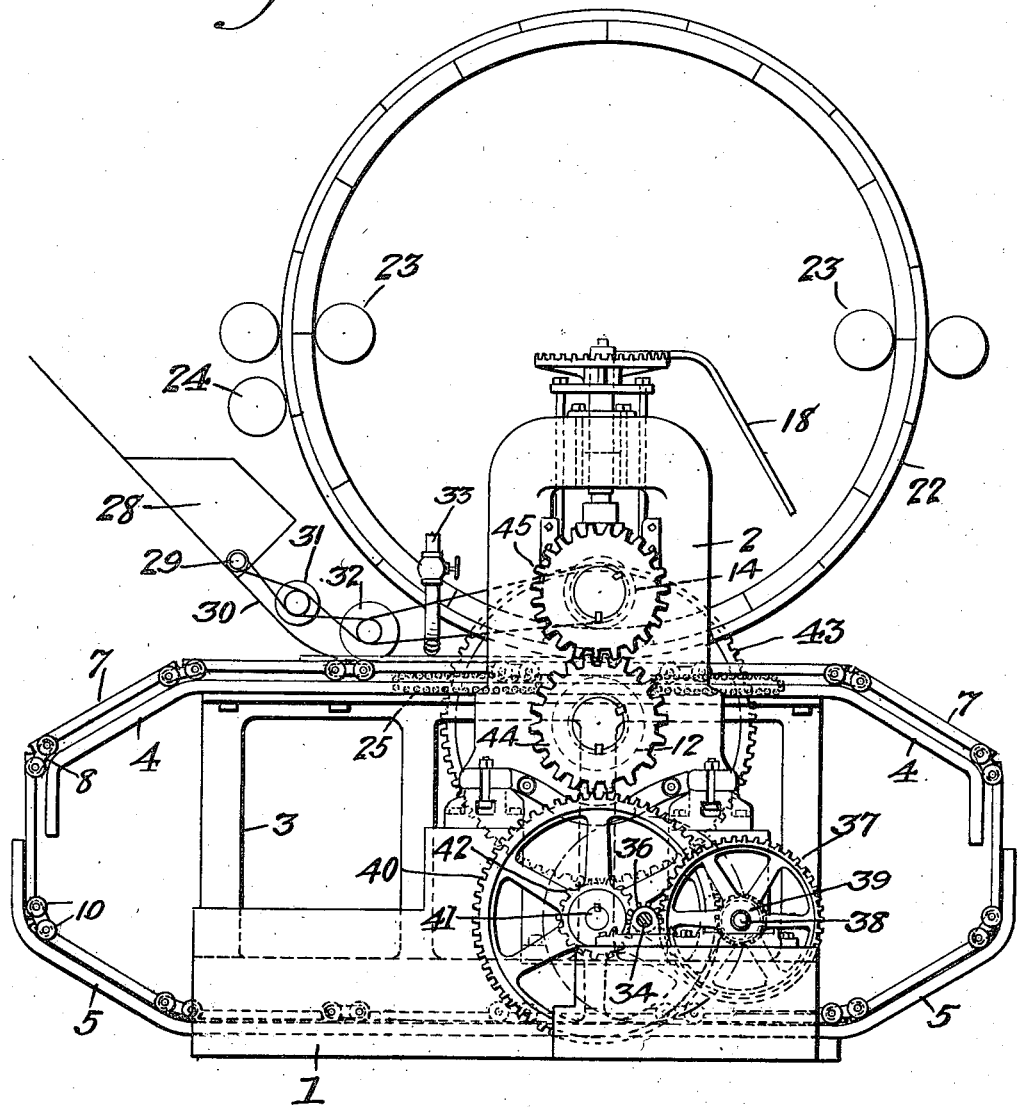
Figure 1 is a side elevation of a machine constructed in accordance with my invention, certain parts thereof being represented only conventionally.

The embodiment of the invention illustrated in the drawing includes a frame having a base 1 and standards 2. Extending upwardly from the base 1 is a track supporting frame 3 on which a pair of spaced tracks 4 are mounted. A similar pair of tracks 5 are supported on the base 1 and extend through an elongated opening 6 in the base. The outer surface of the upper tracks 4 act as a traction surface, as does also the inner surface of the lower tracks 5. A plurality of flat molds 7 are arranged to travel in a continuous series around this track and the ends of the molds 7 are secured pivotally together by links 8. These links are attached at their ends to trunnions 9, which are crank shaped, being extended into the edges of the molds, as illustrated in Fig. 6 of the drawing. On these trunnions 9 wheels 10 are mounted and the axis of rotation of the wheels 10 is in alinement with the lower surface of the molds 7. The arrangement of these wheels 10 in this manner permits the ends of the molds 7 to be made square, as illustrated at 11 in Fig. 4 of the drawing, and yet permits the molds to follow the contour of the tracks without the ends of the molds contacting. The particular advantage in this arrangement lies in the fact that a very small space need be left between the ends of the molds and, as a result, the sheet of asbestos which is the product of the machine, will emerge from the machine with very little or no unevenness, in its surface.

A lower pressure roll 12 is mounted in bearings 13 on the standards 2 and this pressure roll is adapted to support the lower molds 7 directly beneath an upper pressure roll 14. This latter pressure roll is mounted in bearings 15, which bearings are adjustable vertically by means of yokes 16. The bearings are held in their adjusted position through the coöperation of screws 17. These screws are held in position by arms 18, by means of which they are turned and which arms selectively engage in notches 19 in the plates 20 which are supported on the upper ends of the yokes 16. A drum 21 is mounted above the lowermost pressure roll 12 and carries the upper molds 22. This drum is guided by suitable rollers 23 and the outer surface of the molds 22 is kept clean by a suitable rotary cleaner 24, which is represented conventionally in the drawing. The upper pressure roll 14 extends through the drum 21 and exerts pressure on the molds 22 indirectly by exerting pressure on the drum 21 at its lowermost point, as clearly disclosed in Figs. 1 and 2 of the drawing. This drum 21, as will be noted, is relatively large in diameter, so that as the material is fed between the molds 22 and the lower molds 7, a great pressure surface will be effective.

In view of the fact that a certain pressure will be exerted to each side of the lower pressure roll 12, I have provided roller bearings 25, which are mounted in a table 26, and which support the molds 7 to each side of the pressure rolls. This table 26 is mounted on the frame 3 which supports the upper tracks 4, as illustrated in Fig. 6 of the drawing. It is to be noted (see Fig. 5) that the upper tracks 4 are provided with depressions 27 directly between the pressure rolls, so that when the utmost pressure is exerted on the molds the wheels 10 which are directly between the pressure rolls will be free of the track and consequently all strain will be taken from the trunnions 9.

Referring particularly to Fig. 1 of the drawing, it will be noted that the material is fed from a hopper 28, in which a mixing or agitating brush 29 is mounted. The material passes from the hopper 28 down a raceway 30 to the upper surface of the lower molds. In its passage down the raceway it is evened, so that the layer is of substantially a uniform thickness, by an evener 31 of any suitable form. After the material reaches the mold boards it is preliminarily compacted by a compacting roll 32. Up to this point all of the operations take place in connection with dry material. After the preliminary compacting, the material is supplied with water through a suitable spray 33 and just sufficient water is added to fill the interstices between the particles of material. In this partly compacted and dampened state the material is carried by the moving lower molds beneath the upper moving molds and by virtue of the pressure exerted by the pressure rolls the final pressure is applied. Because of the gradual inclination of the upper molds toward the lower molds, due to the great diameter of the drum 21, the pressure on the sheet of material gradually increases until the maximum pressure is exerted between the pressure rolls. The result of this arrangement is the production of a sheet of material which is of surprising uniform density and fineness of finish. Furthermore, the addition of the water after the preliminary compacting has taken place insures the abolishing of the usual objectionable wet condition about machines of this character, and furthermore, saves considerable material.

The driving mechanism for the machine includes a main drive shaft 34 on which a pulley 35 is mounted. The power is transmitted to this shaft through the pulley from any suitable source. On this shaft 34 a pinion 36 is mounted, and this pinion meshes with a gear 37 which is secured to a shaft 38. A pinion 39 is also secured to this shaft 38 and meshes with a gear 40 which is relatively larger than the gear 37. This gear 40 is secured to a shaft 41 and on which shaft a pinion 42 is secured. This pinion meshes with a gear 43 which is relatively larger than the gear 40 and which is secured to the trunnion on the end of the lowermost pressure roll 12. On the opposite end of this pressure roll is a relatively smaller gear 44, which meshes with a similar gear 45 on the adjacent end of the upper pressure roll 14. It will be noted on inspection of Fig. 1 of the drawing that the teeth of the gears 44 and 45 are considerably deeper than the usual gear teeth and these deep teeth are provided so as to allow for the vertical adjustment, either upwardly or downwardly, of the upper pressure roll 14 and so as to permit the teeth of these gears 44 and 45 to interengage in spite of the adjustment.

What I claim is:—

1. In a machine for forming sheets of plastic material, a lower pressure roll, an endless series of molds passing over said roll, a relatively large drum carrying upper molds arranged to coöperate with the lower molds, an upper pressure roll extending through and exerting pressure on said drum, and means for rotating the pressure rolls.

2. In a machine for forming sheets of plastic material, a lower pressure roll, an endless series of molds passing over said roll, means for supporting the molds at each side of the roll, a drum carrying upper molds, and an upper pressure roll for exerting pressure on said drum.

3. In a machine for forming sheets of plastic material, a lower pressure roll, a series of molds passing over said pressure roll, a drum carrying upper molds, an upper pressure roll extending through and arranged to exert pressure on said drum, said drum being vertically movable, and means for adjusting the upper pressure roll vertically.

4. In a machine for forming sheets of plastic material, a lower pressure roll, a series of flat molds passing over said roll, a track for supporting said molds, roller bearings arranged to engage the under surface of the molds at opposite sides of the roll, upper molds, and means for exerting pressure on said molds.

5. In a machine for forming sheets of plastic material, a lower pressure roll, a series of molds arranged to pass over said roll, wheels for supporting said molds, tracks on which said wheels are operable, the said tracks having depressions therein in alinement with the pressure roll to permit the molds to rest on the roll and the wheels to be free of the tracks, upper molds, and means for exerting pressure on the same.

6. In a machine for forming sheets of plastic material, a lower pressure roll, a series of molds arranged to pass over said roll, wheels for supporting said molds, tracks on which said wheels are operable, the said tracks having depressions therein in alinement with the pressure roll to permit the molds to rest on the roll and the wheels to be free of the tracks, means on both sides of the lower pressure roll to support the molds when the wheels are thus free of the tracks, upper molds, and means for exerting pressure on the same.

7. In a machine for forming sheets of plastic material, a lower pressure roll, a series of molds arranged to pass over said roll, wheels for supporting said molds, tracks on which said wheels are operable, the said tracks having depressions therein in alinement with the pressure roll to permit the molds to rest on the roll and the wheels to be free of the tracks, roller bearings extending transversely of the molds and arranged at opposite sides of the pressure roll for supporting the molds, upper molds, and means for exerting pressure on the same.

8. In a machine for forming sheets of plastic material, a lower pressure roll, a series of molds passing over the same, a relatively large drum carrying upper molds, a pressure roll for exerting pressure on the drum, a supply hopper, a raceway for conveying the material to the lower molds, means for smoothing the material into an even layer during its passage down said raceway, means for preliminarily compacting said smoothed material, and means for adding moisture to the material between said means and said pressure rolls.

9. In a machine for forming sheets of plastic material, a lower pressure roll, an endless series of molds passing over said pressure roll, links securing the ends of the molds together pivotally, wheels mounted on the molds at the sides thereof and having their axes of rotation in alinement with the lower surface of the molds, tracks for supporting the wheels, and upper molds coöperating with the lower molds.

10. In a machine for forming sheets of plastic material, a lower pressure roll, an endless series of molds passing over said roll, said molds being flat and having their ends square and in slight spaced relation only, links pivoting the ends of the molds together, wheels supporting the molds at the ends thereof, the axes of rotation of the wheels being in alinement with the lower faces of the molds, upper molds, and means for exerting pressure on the same.

11. In a machine for forming sheets of plastic material, an endless series of lower molds, a relatively large drum carrying upper molds arranged to coöperate with the lower molds, and means to exert pressure on said drum.

12. In a machine for forming sheets of plastic material, an endless series of flat molds, having square ends arranged in substantial abutment with each other, and links extending between and connecting the ends of the molds together, said links being pivoted to the molds at the sides thereof, and the pivotal axes being in alinement with the lower faces of the molds.

In testimony whereof I affix my signature.

THOMAS ROSE.